United States Patent [19]
Bartscher et al.

[11] Patent Number: 5,101,754
[45] Date of Patent: Apr. 7, 1992

[54] DEVICE FOR SURVEILLANCE OF A PRESSURE IN A VEHICLE TIRE

[75] Inventors: Peter Bartscher, Hanover; Erwin Petersen, Wunstorf; Erich Reinecke, Burgdorf; Günther Singbartl; Manfred Schniggenfittich, both of Hanover; Gerhard Stegemann, Salzremmendorf; Helmut Ulrich, Springe, all of Fed. Rep. of Germany

[73] Assignee: WABCO Westinghouse Fahrzeugbremsen, Hanover, Fed. Rep. of Germany

[21] Appl. No.: 575,376

[22] Filed: Aug. 29, 1990

[30] Foreign Application Priority Data

Sep. 9, 1989 [DE] Fed. Rep. of Germany ....... 3930092

[51] Int. Cl.$^5$ .............................. B60C 23/04
[52] U.S. Cl. ................. 116/34 R; 73/146.8; 137/226
[58] Field of Search ............ 116/34 R; 73/146.5, 73/146.8; 137/227, 228

[56] References Cited

U.S. PATENT DOCUMENTS

| 3,859,849 | 1/1975 | Novak | 73/146.8 |
| 4,203,467 | 5/1980 | Cardi | 137/227 |
| 4,235,185 | 11/1980 | Byram | 73/146.8 X |
| 4,708,169 | 11/1987 | Liu | 73/146.8 X |

FOREIGN PATENT DOCUMENTS

| 0526227 | 5/1931 | Fed. Rep. of Germany . |
| 2813058 | 4/1984 | Fed. Rep. of Germany . |

Primary Examiner—Daniel M. Yasich
Attorney, Agent, or Firm—Horst M. Kasper

[57] ABSTRACT

A device for the surveillance of the pressure of a vehicle tire includes a pressure-sensitive device which senses the tire pressure and generates, in case of a pressure loss in the tire, a pressure change signal. A set member is actuated with this pressure change signal such that the signal member performs a stroke. A sensor tests the position of the set member and recognizes when the tire pressure is too low. A pressure-sensitive device (1) includes a check valve (9, 12), opening toward the pressure discharge port (3). The pressure at the pressure discharge port (3) can be blocked versus the tire pressure based on the check valve (9, 12). The invention device is suitable for furnishing a continuous signal up to the complete emptying of a tire.

20 Claims, 1 Drawing Sheet

DEVICE FOR SURVEILLANCE OF A PRESSURE IN A VEHICLE TIRE

BACKGROUND OF THE INVENTION

1. Field of the Invention

The invention relates to a device for the surveillance of the pressure of a vehicle tire including a pressure-sensitive device disposed at the vehicle wheel for monitoring the tire pressure, which includes a pressure inlet port, to which the tire pressure is applied, and which includes a pressure discharge port, which can be connected to the pressure inlet port of the device for surrveilance.

2. Brief Description of the Background of the Invention Including Prior Art

The German Patent DE-2,813,058 C2 teaches a related device. The device of this reference monitors the tire pressure with a pressure-sensitive device, where the pressure-sensitive device is disposed at the vehicle wheel. In case the tire pressure falls below a preset tire pressure value, the pressure-sensitive device generates an output signal at the pressure discharge port furnished as a signal pressure, which corresponds to the existing tire pressure. A set member of a signal transfer device is actuated with this signal pressure such that the set member performs a stroke. The signal transfer device is also disposed at the vehicle wheel. A sensor, disposed fixed relative to the axis, monitors the position of the set member and recognizes thereby a tire pressure, which is disposed below a preset tire pressure. A corresponding information of the sensor can then be fed via an evaluation circuit to a display device. The display device can, for example, be disposed in the driver cabin.

If the tire pressure is equal to or higher than the preset tire pressure, then no signal pressure is present at the pressure discharge port of the pressure-sensitive device based on the constructive features of the pressure-sensitive device of the German Patent DE-2,813,058 C2. Consequently, the set member of the signal transfer device is disposed in starting position in which no display signal occurs or, respectively, the sensor recognizes that the tire existing pressure is disposed below the preset tire set-point pressure, based on the spring-loading of the set member.

Alternatively, the set member can assume the above-recited non-indicating starting position, if, based on a markedly dropped tire pressure, the signal pressure, applied to the set member, has become so low that the force of a restoring spring directed opposite to the signal pressure and coordinated to the set member prevails. The device according to the German Patent DE-2,813,058 C2 therefore is associated with the disadvantage that the tire-pressure surveillance can only be reliably performed up to a certain minimum tire pressure, where the minimum value of the tire pressure level is determined substantially by the force of the restoring spring.

The German Patent No. 526,227 to Hubert Tastenhoye et al. teaches a device for indicating a decreasing gas pressure, in particular for air tires. The reference uses a structure which employs seals and valves and a spring 15' for a pressure level assertation. The reference employs a whistling signal for indicating the presence of a low pressure. Such a whistling signal is associated with the disadvantage that it may not be of sufficient intensity that it can be heard or, alternatively, that it causes too much of a disturbance.

The German Patent Application Laid Open DE-OS 2,816,397 to Erhard Kenk teaches a valve with an optical display device for indicating a pressure decrease in an air-filled tire. The reference employs a valve pipe 2 with one or several openings 3 and a sealing cylindrical membrane 5 placed on the vave pipe 2. The reference employs light-reflection ratios to observe changes in the tire pressure. No provision is made for the presence of a signal at a remote location relative to the tire, for example, in the driver cabin.

The German Patent Application Laid-Open DE-OS 2,650,444 to Edward Joseph Cook teaches a device for surveillance of the pressure in a vehicle tire. The reference teaches to employ an acoustic valve for air-filled tires with a valve casing, which is directly attached to the wheel or to the tire valve. The teaching of this reference with the sound generation again does not appear to be a safe and practical solution in cases where reliability of a safety action is required.

The German Patent Application Laid Open DE-OS 2,528,180 to Nikolaus Botsis teaches an air-chamber valve for air-filled tires. A display device 6 is screwed into a bore. A display pin 21 is pushed outward upon occurrence of a leak in the air chamber in case of entry of air into the interior of the neck port 27. No remote indication is illustrated in this reference.

The German Petit Patent DE-G 8,330,963.2 to Rainer Achterholt teaches a valve cap for air-filled tires. The structure employs a membrane 26 which is applied with a spring ring 28. In this case, however, the sealing of the membrane 26 is not perfect. The presence of such a membrane appears to be a possibility of reduced safety of the reference device.

The German Petit Patent DE-G 8,206,932.8 to Wolfgang Lubs teaches a surveillance device for filling quantities. An apparatus is shown which allows to test the level of the pressure present in an automobile tire. No continuous monitoring appears to be a feature of this reference structure.

SUMMARY OF THE INVENTION

1. Purposes of the Invention

It is an object of the invention to provide a device for surveillance of the tire in a vehicle wheel which is improved as compared to conventional structures such that, in cases where the tire pressure falls below a set point value, there is a clear display of this state.

It is a further object of the present invention to provide a safety indicator, which indicates the falling of a pressure below a set-point value and which reliably performs such a display.

These and other objects and advantages of the present invention will become evident from the description which follows.

2. Brief Description of the Invention

According to the invention a pressure-sensitive device 1 to be placed at a vehicle wheel for the monitoring of a pressure in a vehicle tire. The pressure sensitive device 1 has a pressure inlet port 2 to be connected to the interior of a tire for communicating with the pressure prevailing in the tire. An automatically actuating check valve is disposed at the pressure-sensitive device and connected to the pressure inlet port and capable of opening in a direction away from the pressure inlet port.

A pressure inlet valve is connected to the pressure inlet port and actuatable by a changing pressure in the tire. A pressure discharge port is connected to the pressure inlet valve such that the pressure inlet port and the pressure discharge port are connected via said inlet valve in case of a dropping of the tire pressure relative to below a predetermined tire set-point pressure. The automatically actuating check valve is constructed for blocking and releasing of the pressure at the pressure discharge port depending on a pressure level in the tire. A discharge valve is connected to the pressure discharge port and actuatable with the pressure communicated from the tire for sensing and monitoring of the pressure prevailing in the tire. An atmospheric outlet is connected to the discharge valve such that the pressure discharge port can be connected with the atmospheric outlet of the pressure-sensitive device via the discharge valve when the tire pressure becomes equal to or higher than the predetermined tire set-point pressure. A signal-transfer device to the pressure discharge port is transmitted by the pressure discharge port for providing a modified signal relative to a pressure change. A set member is disposed in the signal-transfer device and actuatable against a restoring force by a change of the pressure communicated from the pressure discharge port.

The pressure-sensitive device has a signal-generating device connected to the pressure discharge port such that the signal-generating device is subjected to a pressure present at the pressure discharge port. A casing of the signal-generating device has a casing opening and integrates the signal-generating device into the casing surrounding the pressure-sensitive device. A signal body is formed as a settable body and incorporated in the signal generating device for generating an observable optical signal for a time duration corresponding to a pressure application to the signal-generating device via the pressure discharge port. The signal body can be placed in motion by application of a pressure change transmitted from the pressure discharge port. A signal-generating part is formed at the signal body and furnished by a signal pin. The signal pin penetrates the casing opening of the signal-generating device. A pressure line connects the pressure discharge port of the pressure-sensitive device to the signal transfer device and the signal-generating device is disposed in the pressure line. The check valve is furnished as an automatic check valve formed by an elastic body including a seal collar. The elastic body is disposed between the pressure inlet port and the inlet valve of the pressure-sensitive device.

According to the invention, there is provided the advantage that the display can be observed in case of a switched-on and in case of a not switched-on electrical or, respectively, electronic part of the tire surveillance by way of a signal.

There is also provided the advantage that, during the filling of an empty tire, the invention allows to recognize that the preset tire set-point pressure has been reached, as well as the function capability of the pressure-sensitive device.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figures 1, 2:
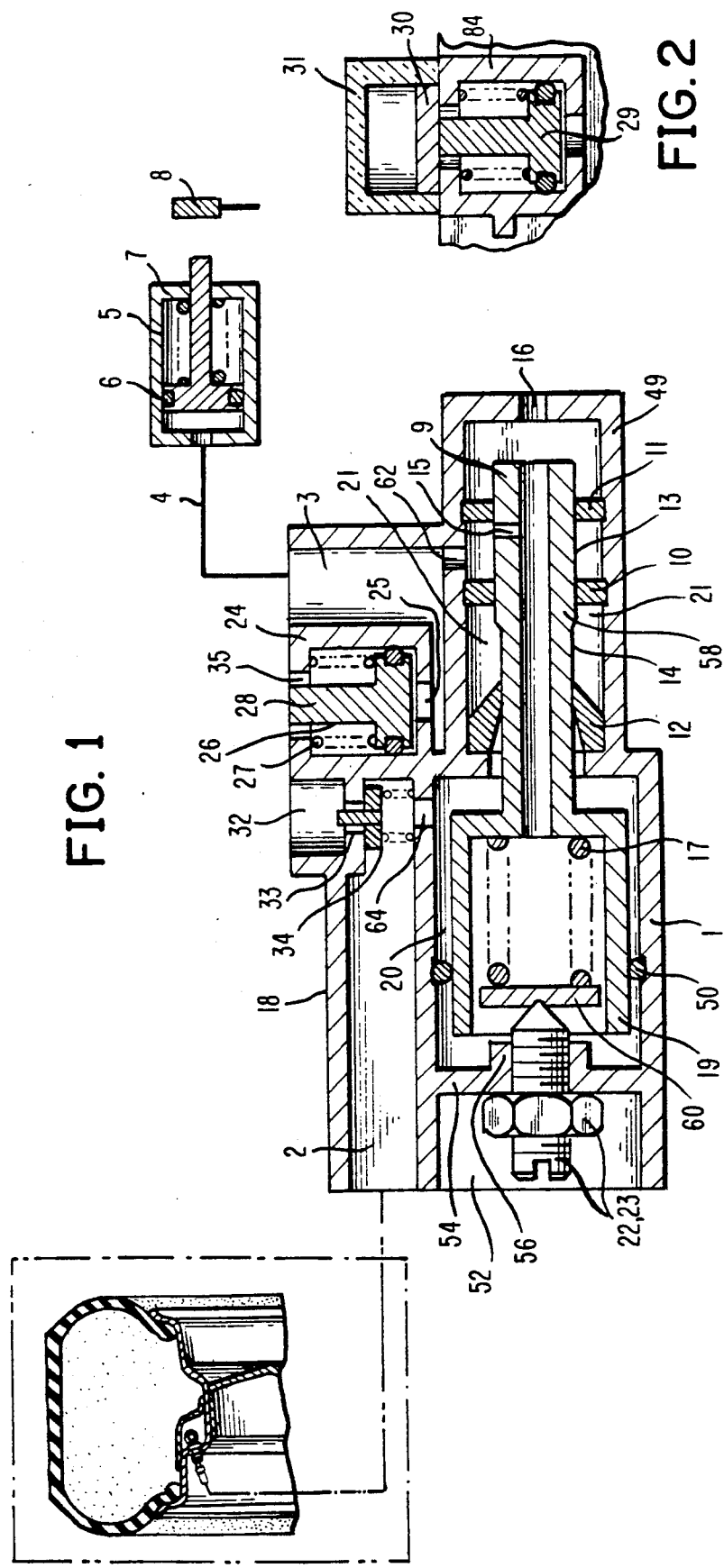
FIG. 1 is a schematic sectional view of a device for surveillance of the tire pressure disposed at a vehicle wheel.
FIG. 2 is a schematic sectional view of a second embodiment of a signal generator of a device according to FIG. 1.

The invention structure serves to display and to indicate the falling of a tire pressure below a preset tire set-point pressure level.

A device for the surveillance of a pressure in a vehicle tire has a pressure-sensitive device 1 for sensing and monitoring of the tire pressure, furnished at a vehicle wheel with a pressure inlet port 2, which pressure inlet port is subjected to the tire pressure, and with a pressure discharge port 3, where the pressure discharge port 3 is connected to the pressure inlet port 2. The device for the surveillance of a pressure in a vehicle tire has the pressure-sensitive device exhibiting an inlet valve 9, actuatable by a changing tire pressure, wherein the pressure inlet port 2 and the pressure discharge port 3 are connected via said inlet valve 9 in case of a dropping of the tire pressure relative to below a predetermined tire set-point pressure. A discharge valve 11, actuatable with the tire pressure, via which the pressure discharge port 3 is connected with an atmospheric outlet 16 of the pressure-sensitive device in case of a changing tire pressure when the tire pressure becomes equal to or higher than the predetermined tire set-point pressure. A set member of a signal-transfer device actuates the pressure discharge port against a restoring force based on a pressure change. An automatically actuating check valve 9, 12 opening toward the pressure discharge port 3. This automatically actuating check valve 9, 12 can block the pressure at the pressure discharge port 3 versus the pressure in the tire.

Furthermore, a signal-generating device 24, 84 is furnished, which can be subjected to the pressure present at the pressure discharge port 3. A signal, such as for example furnished by an optically observable signal body 28, 30, can be generated with the signal-generating device 24, 84 for the time duration of a pressure application to the signal-generating device 24, 84.

In particular, the optically observable signal can be generated with a set body 26, 29 of the signal-generating device 24, 84, movable by application of pressure of the pressure discharge port 3.

A signal-generating part 28 of the set body 26 can be formed by a signal pin 28, penetrating a casing opening 35 of the signal-generating device 24, 84. A signal-generating part 30 of the set body 29 can be formed by a signal body 30 passing by an indicator window of the signal-generating device 24, 84. The signal-generating part 28, 30 of the set body 26, and the signal-generating part 30 of the set body 29 (FIG. 2) can optically be emphasized by coloration. The signal-generating device 24, 84 is preferably integrated into a casing 18 surrounding the pressure-sensitive device 1. The signal-generating device 24, 84 is advantageously disposed in a pressure line 4 connecting the pressure discharge port 3 of the pressure-sensitive device 1 to the signal-transfer device 5. The automatically operating check valve 9, 12 can be formed by an elastic body 12 in the kind of a seal collar, which elastic body 12 is disposed between the pressure inlet port 2 and the inlet valve 9, 10 of the pressure-sensitive device 1.

In detail, a pressure-sensitive device 1 with a pressure inlet port 2 and disposed at a vehicle wheel and preferably at the rim is illustrated in FIG. 1. The pressure inlet port 2 is connected to the interior of a vehicle tire and the tire pressure is applied to the pressure-sensitive device 1. An axially fixedly disposed pressure discharge port 3 is connected via a pressure line 4 to a signal transfer device 5, also disposed at the vehicle wheel. The signal transfer device 5 exhibits a set member 6. The set member 6 can be actuated by the pressure prevailing in the pressure discharge port 3 such that the set member 6 can perform a stroke. In case of a pressureless pressure discharge port 3, the set member 6 assumes its starting position under the force of a spring 7, disposed and directed opposite to the pressure of the pressure discharge port 3. A sensor 8, monitors the position of the set member 6 and thereby recognizes the state of the tire pressure.

The pressure-sensitive device 1 includes a valve body 9, furnished in the kind of a valve slider. The valve body 9 forms an inlet valve 9, 10 with a valve seal 10, and forms a discharge valve 9, 11 with a valve seal 11. Furthermore, the valve body 9 forms an automatically actuating check valve 9, 12 with an elastic body 12, shaped formed like a seal collar, opening toward the pressure discharge port. The check valve 9, 12 is disposed between the pressure inlet port 2 and the inlet valve 9, 10 of the pressure-sensitive device 1.

The valve body 9 includes two different diameters 13, 14, where the larger diameter 13 changes step-like at step collar 58 into the smaller diameter 14. The inlet valve 9, 10 is closed in the position of the valve body 9 illustrated in FIG. 1. The discharge valve 9, 11 is disposed in the open position, where the pressure discharge port 3 is connected to an atmospheric outlet 16 of the pressure-sensitive device 1 via a passage conduit 15. Based on a longitudinal motion of the valve body 9, the passage conduit 15 assume such a position, wherein an annular slot is generated between the diameter 14 and the valve seal 10, i.e. the inlet valve 9, 10 is open. Simultaneously, there occurs a closing of the discharge valve 9, 11, wherein the passage conduit 15 is separated from the pressure discharge port 3 by the valve seal 11.

The pressure inlet port 2 is connected to the pressure discharge port 3 via the check valve 9, 12 in case of an open position of the inlet valve 9, 10, such that the tire pressure is present at the pressure inlet port 2 and at the pressure discharge port 3. The pressure discharge port 3 is then separated from the atmospheric outlet 16 by the closed discharge valve 9, 11.

Upon removal of the tire pressure at the pressure inlet port 2, the tire pressure present at the pressure discharge port 3 is prevented by the check valve 9, 12 to flow back to the pressure inlet port 2.

The motion of the valve body 9 is controlled, on the one hand, by tire pressure and, on the other hand, with the force of a spring 17 directed opposite to the tire pressure. The spring 17 is supported, on the one hand, at a plate 60 of the casing 18 and, on the other hand, at the piston 19 connected with the valve body 9. The tire pressure, entering via the pressure inlet port 2 into the pressure-sensitive device 1, is applied in the pressure chambers 20, 21 such that, upon application of the piston 19 with the preset tire set-point pressure, the valve body 9 assumes a position against the force of the spring 17 and comprising spring 17. Consequently, whereby the inlet valve 9, 10 is closed and the discharge valve 9, 11 is opened based on a seal ring 50 between a pressure-sensitive device 1 and the piston 19. The response threshold of the pressure-sensitive device 1 can be adjusted with an adjustment device 22, 23 engaging the plate 60 for tensioning of the spring 17.

A signal-generating device 24, 84 is furnished and includes a pressure inlet port 25. The pressure from the pressure discharge port 3 can be applied to the pressure inlet port 25 via a communicating channel for the pressure prevailing at the discharge port 3. A set body 26 is furnished with a spring and is arranged to oppose the prevailing pressure of the pressure discharge port 3. The set body 26 includes a signal pin 28, which serves as a part for generating a signal and which is visible by a way of a passage through a casing opening 35 for the time duration while the pressure of the pressure discharge port 3 is applied to the signal generating device 24, 84.

Alternatively, FIG. 2 illustrates a set body 29, where the signal-generating part is formed by a signal body 30. This signal body 30 can pass during its stroke motion by an indicator window 31. The signal-generating parts 28, of the set body 26, and the signal-generating part 30 of the set body 29 can be optically enhanced and emphasized by coloration.

The signal-generating device 84 shown in FIG. 2 is integrated into the casing 18 illustrated in FIG. 1 surrounding the pressure-sensitive device 1. Alternatively, the signal-generating device 24, 84 can, however, be disposed in a separate casing, including the pressure-sensitive device 1, together with the pressure line 4 connecting the signal transfer device 5.

A conventional tire inflation connector with an filling inlet valve 33, 34 is designated with the position 32. This tire inflating connector 32, integrated in this case into the casing 18 of the pressure-sensitive device 1, can however also be disposed at any desirable position of the rim and can be connected to the interior of the tire.

Another conventional system for monitoring the tire pressure, such as, for example a reference pressure chamber, determining the motion of the valve body 9, for the balancing of the tire and rim temperature, can cooperate with the piston 9 representing the subject-matter of the invention instead of the piston 19 and the spring 17.

The mode of operation of the invention arrangement is as follows.

When a tire pressure is equal to or higher than the preset tire set-point pressure, then this tire pressure is applied at the pressure inlet port 2 and in the chambers 20 and 21. The valve body 9 is then disposed in a switch position, wherein the inlet valve 9, 10 is closed and wherein the pressure discharge port 3 is connected via the discharge valve 9, 11 with the passage conduit 15 with the atmospheric outlet 16 to the atmosphere as illustrated in the position shown in FIG. 1. The set member 6 of the signal transfer device 5 and the set body 26 of the signal generating device 24, 84 are without pressure in this state of the operation. In this case the sensor 8 generates and transduces no signal and the signal pin 28 or, respectively, the signal body 30, does not generate a signal which could be optically observed.

Upon a decrease of the tire pressure to below the preset tire set-point pressure, the force of the spring 17 prevails over the tire pressure as applied to valve body 9. The valve body 9 is thereby moved into a switch position to the right of FIG. 1, wherein the inlet valve 9, 10 is opened by forming of an annular slot between the valve seal 10 and the diameter 14 of the valve body 9. The pressure discharge port 3 is then no longer connected to the atmospheric outlet 16, since the passage conduit 15 has passed by the seal 11 toward the right relative to FIG. 1 in closing direction.

In this operational state, the pressure inlet port 2 and the pressure discharge port 3 are connected to each other via the check valve 9, 12 and the via the inlet valve 9, 10. The set member 6 and the set body 26, 29 are subjected to a pressure and are brought into their respective signal position. The dropped tire pressure is sensed during a driving of the vehicle by the sensor 8 based on the set member 6 passing by at the sensor 8, and the dropped tire pressure is indicated by the signal-generating part, i.e. the signal pin 28 and/or the signal body 30 of the set body 26, 29.

In case of a further drop in tire pressure, up to a complete emptying of the tire, the inlet valve 9, 10 remains open and the discharge valve 9, 11 remains closed. The pressure present at the pressure discharge port 3 is prevented by the check valve 9, 12 to flow back to the lower pressure level of the pressure inlet port 2. Thereby, also the signals of the signal transfer device 5 and of the signal-generating device 24, 84 remain effective until the predetermined tire set-point pressure is again present at the pressure inlet port 2.

Upon switching off of the electrical or, respectively, electronic parts of the tire-pressure surveillance, or upon stopping of the vehicle, the sensor 8 can in fact no longer transmit any information, however, the optically visible and observable display of the signal-generating device 24, 84 in the neighborhood of the tire remains intact and operating.

Upon a refilling of the tire, i.e. upon reaching of the predetermined tire set-point pressure at the pressure inlet port 2, the optically visible and observable signal is reset into a non-indicating position based on a venting of the pressure discharge port 3 via the discharge valve 9, 11 into the atmospheric outlet 16. The reaching of the predetermined tire pressure as well as the functioning of the pressure-sensitive device 1 can be recognized from this resetting step.

The seal collar or elastic body 12 can be formed as a ring having an inner conical face with a relatively smaller cone angle and having an outer conical face with a relatively larger cone angle, where the inner cone and the outer cone intersect approximately at the position contacting the diameter 14 of the valve body 9.

The entire filling inlet valve 33, 34 can be disposed opposite to a connection opening from the pressure inlet port 2 to the valve chamber 20. The arrangement of the pressure inlet port 2, of the filling inlet valve 33, 34, of the signal-generating device 24, 84, and of the pressure discharge port 3 can be disposed on one longitudinal side relative to the casing surrounding the elongated valve body 9. The position of the connection bore 64 connecting the pressure inlet port 2 to the chamber 20 and the connection bore 62 connecting the chamber 21 to the pressure discharge port 3 in open position of the valve 9, 10 substantially define the relative position of pressure inlet 2, pressure discharge port 3, filling inlet valve 33, 34 and signal generating device 24, 84 to each other. Since the pressure inlet port 2, the chamber 20, the chamber 21, and the pressure discharge port 3 are sequentially disposed relative to the flow of air under pressure, a particularly compact structure results where the pressure inlet port 2 and the pressure discharge port 3 are disposed in a parallel radial direction relative to an axis of the valve body 9 and where the connection openings between the pressure inlet port 2 and the valve chamber 20 and the valve chamber 21 and the pressure discharge port 3 are disposed also on a parallel of this radial direction relative to the valve body 9.

Preferably, the filling inlet valve 33, 34 and the signal-generating device 24, 84 are disposed between the pressure inlet port 2 and the pressure discharge port 3, such that the filling inlet valve 33, 34 connects directly to the pressure inlet port 2, and such that the signal-generating device 24, 84 connects directly to the pressure discharge port 3.

The pressure inlet port 2 comprises preferably a cylindrical tube which is aligned in parallel to the valve body axis. The pressure discharge outlet port 3 is preferably a cylindrical tube which is directed perpendicular to the valve body axis, where, however, the axis of the pressure inlet port 2 and the axis of the pressure discharge port 3 are disposed in a joint plane.

The invention device can be constructed such that the adjustment screw device 22, 23 is actuatable from the same side where the pressure inlet port 2 is disposed. The adjustment screw device 22 is preferably disposed in a recess 52 formed in the casing of the pressure sensitive device 1. This avoids inadvertent interaction and disturbances of the position of the adjustment screw device 22 represented by a set screw in FIG. 1. The recess 52 may have a diameter which corresponds closely to the diameter of the chamber 20. The area of the adjustment screw device passing through the wall section 54, which is reinforced at its center 56, is separated from the chamber 20 by a seal ring 50.

Preferably, the direction of the spring action of the spring 27 is disposed perpendicular to the action of the spring 17 such that the signal pin 28 moves in a direction perpendicular to the direction of motion of the valve body 9. This increases the independence of the relative motion of these two bodies.

The diameter of the web 49 in the area of the chamber 20 can be from about 2 to 4 times, and preferably from about 2.5 to 3 times, the smaller diameter 14 of the valve body in the area forming the check valve 9, 12 with the elastic body or seal collar 12. The inner diameter of the chamber 20 can be from about 1.2 to 2 times, and is preferably from about 1.3 to 1.6 times the inner diameter of the chamber 21. The distance between the seals 10 and 11 can be from about 0.8 to 1.2 times the stroke path length of the valve body 9.

It will be understood that each of the elements described above, or two or more together, may also find a useful application in other types of surveillance devices differing from the types described above.

While the invention has been illustrated and described as embodied in the context of device for the surveillance and monitoring of the pressure in a vehicle wheel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A pressure-sensitive device to be placed at a vehicle wheel for the monitoring of a pressure in a vehicle tire, comprising
    a pressure inlet port to be connected to the interior of a tire for communicating with the pressure prevailing in the tire;
    a pressure discharge port;
    an inlet valve connected to the pressure inlet port and actuatable by a changing pressure in the tire, wherein the a pressure discharge port is connected to the pressure inlet valve such that the pressure inlet port and the pressure discharge port are connected via said inlet valve in case of a dropping of the tire pressure relative to below a predetermined tire set-point pressure;
    a discharge valve connected to the pressure discharge port and actuatable with the pressure communicated from the tire operating on the discharge valve for sensing and monitoring of the pressure prevailing in the tire;
    an atmospheric outlet connected to the discharge valve such that the pressure discharge port can be connected with the atmospheric outlet of the pressure-sensitive device via the discharge valve when the tire pressure becomes equal to or higher than the predetermined tire set-point pressure;
    a signal-transfer device to the pressure discharge port for providing a modified signal relative to a pressure change transmitted by the pressure discharge port;
    a set member disposed in the signal-transfer device and actuatable against a restoring force by a change of the pressure communicated from the pressure discharge port;
    an automatically actuating check valve including valve actuation means and disposed at the pressure-sensitive device and capable of opening toward the pressure discharge port and wherein this automatically actuating check valve is constructed for blocking the pressure at the pressure discharge port relative to the tire pressure.

2. The pressure-sensitive device according to claim 1 further comprising
    a signal-generating device is furnished connected to the pressure discharge port such that the signal-generating device is subjected to a pressure present at the pressure discharge port;
    a signal body incorporated in the signal generating device for generating a signal for a time duration corresponding to a pressure application to the signal-generating device via the pressure discharge port.

3. The pressure-sensitive device according to claim 2 further comprising
    a casing integrating the signal-generating device into the casing surrounding the pressure-sensitive device.

4. The pressure-sensitive device according to claim 2 further comprising
    a pressure line connecting the pressure discharge port of the pressure-sensitive device to the signal transfer device, wherein the signal-generating device is disposed in the pressure line.

5. The pressure-sensitive device according to claim 1, wherein the automatic check valve is furnished by an elastic body including a seal collar, where the elastic body is disposed between the pressure inlet port and the inlet valve of the pressure-sensitive device.

6. The pressure-sensitive device according to claim 2, wherein the signal is optically observable;
    wherein the signal body is a settable body and wherein the signal body can be placed in motion by application of a pressure condition transmitted from the pressure discharge port.

7. The pressure-sensitive device according to claim 6, further comprising
    a casing of the signal-generating device having a casing opening;
    a signal-generating part formed at the signal body and furnished by a signal pin, wherein the signal pin penetrates the casing opening of the signal-generating device.

8. The pressure-sensitive device according to claim 7 further comprising
    a signal-generating part formed at the set body; coloration disposed at the signal-generating part for optically emphasizing the signal-generating part.

9. The pressure-sensitive device according to claim 6 further comprising
    an indicator window set into the signal generating device; a signal-generating part formed at the signal body and passing by an indicator window of the signal-generating device in case a pressure condition is communicated from the pressure discharge port.

10. A device for the surveillance of a pressure in a vehicle tire, comprising
    a) a pressure-sensitive device for sensing and monitoring of the tire pressure, furnished at a vehicle wheel with a pressure inlet port, which pressure inlet port is subjected to the tire pressure, and with a pressure discharge port, where the pressure discharge port is connected to the pressure inlet port,
    b) the pressure-sensitive device exhibiting an inlet valve, actuatable by a changing tire pressure, wherein the pressure inlet port and the pressure discharge port are connected via said inlet valve in case of a dropping of the tire pressure relative to below a predetermined tire set-point pressure,
    c) the pressure-sensitive device exhibiting a discharge valve, actuatable with the tire pressure, via which the pressure discharge port is connected with an atmospheric outlet of the pressure-sensitive device in case of a changing tire pressure wherein the tire pressure becomes equal to or higher than the predetermined tire set-point pressure,
    d) a set member of a signal-transfer device actuates the pressure of the pressure discharge port against a restoring force based on a pressure change, wherein
    d) the pressure-sensitive device (1) exhibits an automatically actuating check valve (9, 12) opening toward the pressure discharge port (3), and wherein this automatically actuating check valve (9, 12) can block the pressure at the pressure discharge port (3) versus the pressure in the tire.

11. The device according to claim 10, wherein a) a signal-generating device (24, 84) is furnished, which can be subjected to the pressure of the pressure discharge port (3), b) a signal, such as for example an optically observable signal body (28, 30), can be generated with the signal-generating device (24, 84) for the time duration of a pressure application to the signal-generating device (24, 84).

12. The device according to claim 11, wherein the signal-generating device (24, 84) is integrated into a casing (18) surrounding the pressure-sensitive device (1).

13. The device according to claim 11, wherein the signal-generating device (24, 84) is disposed in a pressure line (4) connecting the pressure discharge port (3) of the pressure-sensitive device (1) to the signal-transfer device (5).

14. The device according to claim 10, wherein the optically observable signal can be generated with a set body (26, 29) of the signal-generating device (24, 84), movable by application of pressure of the pressure discharge port (3).

15. The device according to claim 14, wherein a signal-generating part (30) of the set body (29) is formed by a signal body (30) passing by an indicator window of the signal-generating device (24, 84).

16. The device according to claim 14, wherein a signal-generating part (28) of the set body (26) is formed by a signal pin (28), penetrating a casing opening (35) of the signal-generating device (24, 84).

17. The device according to claim 16, wherein the signal-generating part (28, 30) of the set body (26, 29) is optically emphasized by coloration.

18. The device according to claim 10, wherein the automatic check valve (9, 12) is formed by an elastic body (12) in the kind of a seal collar, which elastic body (12) is disposed between the pressure inlet port (2) and the inlet valve (9, 10) of the pressure-sensitive device (1).

19. A pressure-sensitive device to be placed at a vehicle wheel for the monitoring of a pressure in a vehicle tire, comprising a pressure inlet port to be connected to the interior of a tire for communicating with the pressure prevailing in the tire;

an automatically actuating check valve disposed at the pressure-sensitive device and connected to the pressure inlet port and capable of opening in a direction away from the pressure inlet port;

a pressure inlet valve connected to the pressure inlet port and actuatable by a changing pressure in the tire; a pressure discharge port connected to the pressure inlet valve such that the pressure inlet port and the pressure discharge port are connected via said inlet valve in case of a dropping of the tire pressure relative to below a predetermined tire set-point pressure and wherein the automatically actuating check valve is constructed for blocking and releasing of the pressure at the pressure discharge port depending on a pressure level in the tire;

a discharge valve connected to the pressure discharge port and actuatable with the pressure communicated from the tire for sensing and monitoring of the pressure prevailing in the tire;

an atmospheric outlet connected to the discharge valve such that the pressure discharge port can be connected with the atmospheric outlet of the pressure-sensitive device via the discharge valve when the tire pressure becomes equal to or higher than the predetermined tire set-point pressure;

a signal-transfer device to the pressure discharge port for providing a signal relative to a pressure condition transmitted by the pressure discharge port;

a set member disposed in the signal-transfer device and actuatable against a restoring force of the pressure communicated from the pressure discharge port.

20. The pressure-sensitive device according to claim 19 further comprising a signal-generating device connected to the pressure discharge port such that the signal-generating device is subjected to a pressure present at the pressure discharge port;

a casing of the signal-generating device having a casing opening and integrating the signal-generating device into the casing surrounding the pressure-sensitive device;

a signal body formed as a settable body and incorporated in the signal generating device for generating an observable optical signal for a time duration corresponding to a pressure application to the signal-generating device via the pressure discharge port and wherein the signal body can be placed in motion by application of a pressure condition transmitted from the pressure discharge port;

a signal-generating part formed at the signal body and furnished by a signal pin, wherein the signal pin penetrates the casing opening of the signal-generating device;

a pressure line connecting the pressure discharge port of the pressure-sensitive device to the signal transfer device, wherein the signal-generating device is disposed in the pressure line;

wherein the check valve is furnished as an automatic check valve formed by an elastic body including a seal collar, where the elastic body is disposed between the pressure inlet port and the inlet valve of the pressure-sensitive device.

* * * * *